United States Patent Office 3,211,536
Patented Oct. 12, 1965

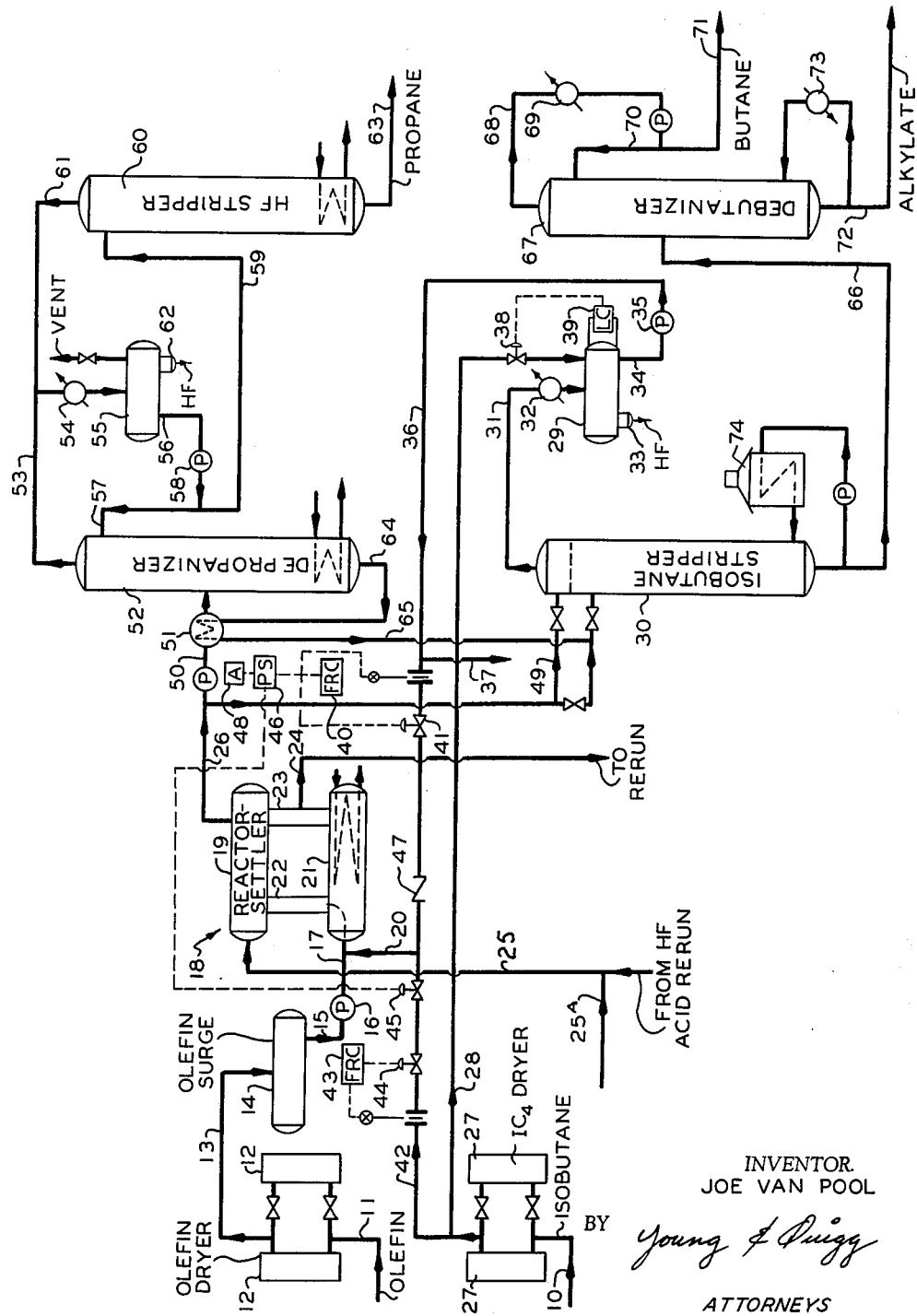

3,211,536
AUTOMATIC PROCESS CONTROL SYSTEM
Joe Van Pool, Bartlesville, Okla., assignor to Phillips Petroleum Company, a corporation of Delaware
Filed Oct. 5, 1962, Ser. No. 228,536
2 Claims. (Cl. 23—285)

This invention relates to a method and apparatus for measuring and controlling fluid flow in fluid distribution systems. In another aspect, this invention relates to a control system for alkylation processes.

In many fluid distribution systems comprising a plurality of fluid flow streams and a place of utilization, it is often desirable, if not essential, in many installations to maintain a predetermined constant total flow rate of the flow streams utilized in order to obtain a desired result. This is especially true, for example, in various chemical reaction processes wherein a plurality of reactants are introduced into a reaction zone of the process, and wherein both fresh and recycled unreacted reactants are employed and particularly where it is desired to maintain the total flow of fresh and recycled reactant at some predetermined rate. One such process is the alkylation reaction wherein isoparaffin comprising both fresh and recycled unreacted isoparaffin are employed as one of the reactants, and wherein it is desired to maintain a necessary minimum total flow of fresh and recycled isoparaffin introduced into the reactor.

In an alkylation unit where isoparaffin, e.g. isobutane, is added to a surge zone containing recycle isoparaffin, by level control, loss of the recycle pump(s) would result in insufficient isobutane in the reaction zone. A shortage of isobutane causes the formation of heavy polymers and organic fluorides. The formation of heavy polymers in the alkylation zone leads to other problems such as plugged fractionators and other equipment which requires shut down of the whole system in order to clean up the equipment. The present invention is directed to a control system which is primarily an emergency system to insure that a necessary minimum supply of isoparaffin, e.g. isobutane, is always charged to the reaction zone even in the event of pump failure in the system.

Accordingly, an object of the present invention is to provide a relatively simple, reliable and efficient combination of instruments for measuring and controlling fluid flow at a total necessary minimum rate.

Another object of this invention is to provide an automatic control system for an alkylation operation.

A further object of this invention is to provide an emergency control system for maintaining a constant total flow of isobutane to an alkylation reaction in the event of failure of isobutane supply.

Still other objects and advantages of this invention will be realized upon reading the following description, which, taken with the attached drawing, forms a part of this specification.

The drawing represents a schematic arrangement of apparatus parts for practicing the control of this invention.

In the drawing reference numerals 10 and 11 identify conduits through which respectively isobutane-containing feed stock and olefin-containing feed stock are passed from sources, not shown, to the system. The olefin feed stock passes from conduit 11 through driers 12, conduit 13, surge tank 14, conduit 15, pump 16 and joins isobutane feed stock from line 20 and the mixture passes through line 17 to an alkylation reactor-settler generally designated 18. Reactor-settler 18 comprises an upper horizontal phase settler 19, a lower horizontal acid collecting and heat exchange tank 21, contacting leg 22 and acid return leg 23. Alkylation catalyst, for example HF acid, is introduced into settler 19 by way of line 24. The isobutane-olefin feed stock introduced by line 17 contacts acid catalyst in riser 22 and forms alkylate which rises to settler 19.

In phase settler 19 a heavy phase comprising hydrofluoric acid and a light hydrocarbon phase comprising alkylate and unreacted hydrocarbons separate. The heavy phase is withdrawn from a settler through line 23 and recycled through heat exchanger 21 to contacting leg or riser 22. A portion of the heavy phase can be withdrawn from line 23 through line 24 for passage to a catalyst regeneration operation if desired. Line 25A is provided for addition of make-up hydrofluoric acid from a source, not shown. A light hydrocarbon alkylate phase is removed from settler 19 by way of line 26 and passed to further processing as described hereinafter.

As indicated, previously, isobutane is introduced into the system by way of line 10. The isobutane feed stock is passed through driers 27 and normally through conduit 28 and then introduced into accumulator 29. Unreacted isobutane recovered overhead from isobutane stripper 30 by way of line 31 is passed through condenser 32 and then introduced into accumulator 29. Residual HF acid remaining in the isobutane in accumulator 29 is removed by way of line 33 and can be returned to the reaction zone 18. A mixed stream comprising fresh isobutane and recycle isobutane is removed from accumulator 29 by way of line 34 and is passed through pump 35, line 36, and then introduced into line 20 for mixing with olefin-feed stock in line 17. The mixed stream of isobutane and olefin is introduced into alkylation reactor 18 for forming of alkylate as described above. A portion of the isobutane mixture in line 36 can be passed by way of line 37 to the acid rerun unit for stripping HF acid from acid soluble oils.

According to the invention, the rate of addition of fresh isobutane in line 28 to accumulator 29 is controlled by valve 38 responsive to the liquid level in accumulator 29 measured by liquid level controller 39. Further, according to the invention, the flow of mixed fresh isobutane and recycle isobutane in line 36 is regulated by rate of flow controller 40 which adjusts the position valve 41 responsive to flow in line 36 to maintain a preset flow rate therethrough.

Also, in accordance with the invention, line 42 is provided for conducting fresh isobutane from line 28 to line 20 and thence to alkylator 18 without passing through accumulator (and isobutane surge tank) 29. Line 42 is connected with flow recorder controller 43 which adjusts the position of valve 44 responsive to flow in line 42. Valve 45, which is normally closed, is also provided in line 42 downstream from valve 44 and is operably connected to pressure switch 46 which in turn is operably connected to flow recorder controller 40. A check valve 47 is provided in line 36 to prevent flow of isobutane from line 42 to line 36.

According to the invention the isobutane feed that can be passed through line 42 to alkylation reactor 18 is an alternative source of isoparaffin reactant in case of failure of supply of fresh and recycle isobutane in line 36. Assuming pump failure by pump 35, there will be an immediate loss of isobutane flow and pressure in line 36 which is sensed by flow controller 40 and pressure switch 46. As soon as the pressure in line 36 drops to a predetermined minimum value, pressure switch 46 actuates valve 45 to its open position. Valve 45 is normally closed. Flow recorder 43 is preset to a minimum isobutane flow value to supply minimum isobutane necessary to insure complete reaction. Thus, as soon as a drop in pressure in line 36 is sensed in FRC–40 and PS–46, valve 45 is opened and fresh isobutane flows through line 42 and 20 to alkylator reactor 18. Check valve 47 in line 36 prevents flow of isobutane from line 42 into line 36. Alarm 48 is operably connected to pressure switch 46 so that an alarm is sounded when the system switches to the alternate source of isobutane for the alkylation reaction. The alarm alerts the operator so that an alternate pump can be put on stream or the trouble causing pump 35 failure can be repaired. As soon as the normal pumping facilities are repaired and recycle and fresh isobutane are flowing once again in line 36, pressure switch 46 senses the increase in pressure. As soon as the pressure in line 36 rises above the predetermined minimum value, valve 45 is closed and once again the system is restored to the original operating conditions.

A portion of the hydrocarbon-rich phase is removed from settler 19 by line 26 and passed directly to isobutane stripper 30 by way of line 49. The remainder of the hydrocarbon phase is passed by way of line 50 through heater 51 and introduced into depropanizer 52. Propane and lighter gases are taken overhead from column 52 by line 53, condensd in condenser 54 and introduced into accumulator 55. Condensed overhead is removed from accumulator 55 by line 56, passed through pump 58 and a portion is returned as reflux by line 57 to column 52. The remainder of the condensed overhead is passed by way of line 59 to HF stripper 60. HF acid is removed overhead from column 60 by line 61 and returned to accumulator 55 from which it is removed by way of line 62. Bottoms comprising propane is removed from column 60 by line 63 for further processing as desired. Hydrocarbons heavier than propane are removed from the base of column 52 by line 64, passed through heat exchanger 51 and then passed by way of line 65 to isobutane stripper 30. Isobutane is removed overhead from column 30 by line 31, condensed in cooler 32 and introduced into accumulator 29 as previously described. A bottoms stream comprising normal butane and alkylate is removed from the base of column 30 by line 66 and passed to debutanizer 67. Butane is taken overhead from column 67 by line 68, condensed in cooler 69, and a portion is returned to column 67 as reflux by line 70. The remainder of the condensed butane is removed for further processing as desired by line 71. An alkylate stream is removed from the bottom column 67 by line 72 for further processing as desired. A portion of the bottoms alkylate in line 72 is returned to the base of column 67 through reboiler heater 73. Similarly, a portion of the bottoms from column 30 in line 66 is passed to fired heater 74 to break down a portion of the organic fluorides in the bottoms product and returned to column 30. The fluorides thus treated are removed from the system by line 33 in overhead accumulator 29.

While it is preferred to use a combination of pneumatic instruments in the invention, it should be realized that substantially the same results can be obtained by the use of electronic instruments. Moreover, a combination of pneumatic and electronic instruments can be used if desired. Pneumatic signals can be conveniently converted into electronic signals and vice versa by employing pneumatic-electronic transducers. An important concept of the present invention involves an arrangement of the particular instruments disclosed in such a way that the total flow rate of several fluid flow streams can be maintained and some predetermined constant total flow.

While the control apparatus is described along with the above described alkylation process flow diagram it should be realized that more than two fluid flow streams can be controlled by the practice of this invention. Furthermore, the invention should not be construed as being limited specifically to HF alkylation flow control since the method and apparatus can be applied to other processes wherein reactant streams are passed to a place of utilization and wherein it is desired to maintain a predetermined necessary minimum flow. Furthermore, the control instruments as described herein are commercially available items of manufacture and it is not intended to limit the invention to any specific type of instrument.

The following is a specific example of operation according to the present invention as described above in connection with the attached drawing.

SPECIFIC EXAMPLE

The compositions and flow rates through the several conduits under normal operation and in an emergency according to the invention are as follows:

(A) *Normal operation*

| Stream Number Component, b./h. | 11 | 10 | 36 | 26 | 42 |
|---|---|---|---|---|---|
| Propylene | 20 | | | | |
| Propane | 20 | 2 | 10 | 34 | |
| Butenes | 40 | | | | |
| Isobutane | 10 | 63 | 350 | 351 | |
| Normal Butane | 10 | 2 | 10 | 22 | |
| Alkylate | | | | 102 | |
| Total | 100 | 67 | 370 | 509 | None |

Temperature, °F _____ 90
Pressure (to maintain liquid phase).
Hydrocarbon/HF Acid Vol. Ratio _____ 1:8
Isobutane/Olefin Vol. Ratio _____ 7:1
Research Octane, 3 cc. TEL _____ 103.0

(B) *Emergency operation (temporary)*

| Stream Number Component, b./h. | 11 | 10 | 36 | 26 | 42 |
|---|---|---|---|---|---|
| Propylene | 20 | | | | |
| Propane | 20 | 6 | | 28 | 6 |
| Butenes | 40 | | | | |
| Isobutane | 10 | 189 | | 123 | 189 |
| Normal Butane | 10 | 6 | | 16 | 6 |
| Alkylate | | | | 93 | |
| Total | 100 | 201 | None | 260 | 201 |

Temperature, °F _____ 90
Pressure (to maintain liquid phase).
Hydrocarbon/HF Acid Vol. Ratio _____ 1:8
Isobutane/Olefin Vol. Ratio _____ 3.3:1
Research Octane, 3 cc. TEL _____ 102.2

From the foregoing it should be evident that there is provided in accordance with this invention an improved control system for an alkylation unit. By providing an emergency system for an alkylation reaction it is possible to operate the unit in an automatic manner so as to provide a total constant flow of reactant at all times to the reaction zone even in the event of pump failure or other reason for one source of reactant namely, isobutane. While the invention has been described in conjunction with a particular reaction of isobutane with olefin, it should be evident that this is not limited to this specific reaction.

While the invention has been described in conjunction with a presently preferred embodiment, it should be evident that it is not limited thereto.

I claim:

1. An apparatus for controlling the flow of a reactant stream to a reaction apparatus comprising, in combination, a reactor, a tank, means for flowing fresh reactant and unused reactant to said tank, first conduit means connected to said tank and said reactor, pressure means operably connected to said first conduit for pressuring reactant from said tank to said reactor, a first control valve means connected to said first conduit downstream of said pressure means, a first flow control sensing means connected to sense the flow in said first conduit and adapted to regulate the position of said first valve responsive to flow in said first conduit, a second conduit connected to said first conduit downstream of said flow control valve and to a source of fresh reactant, a check valve means in said first conduit near the juncture of said first and second conduits to prevent reactant from said second conduit entering said first conduit, a second flow control sensing means in said second conduit adapted to maintain the flow in said second conduit at substantially the same flow rate as in said first conduit, a second control valve means operably connected to said second conduit, and a pressure control means connected to said first flow control sensing means and said second control valve means adapted to move said second valve from a normally closed position to the open position responsive to a substantial pressure drop in said first conduit, thus insuring a source of reactant for said reactor during said pressure drop.

2. The apparatus of claim 1 further including an alarm connected to said first flow control sensing means to alert an operator in case of pressure failure so that the trouble can be repaired and the system returned to normal operation, and a liquid level controller connected to said tank and the line feeding fresh reactant to said tank to regulate the rate of fresh reaction addition responsive to liquid level.

References Cited by the Examiner

UNITED STATES PATENTS

| 2,292,857 | 3/60 | Hutto | 260—683.48 |
| 3,002,818 | 10/61 | Berger | 260—683.48 |
| 3,018,310 | 1/62 | Van Pool | 260—683.48 |

OTHER REFERENCES

Heat Engineering, Foster Wheeler Corp., N.Y., vol. XXXIV, No. 2, p. 32, March–April 1959.

McCabe and Smith, Unit operations of chemical engineering, N.Y., McGraw-Hill, 1956, p. 152–153.

ALPHONSO D. SULLIVAN, *Primary Examiner.*